United States Patent [19]
Jackson

[11] 3,796,001
[45] Mar. 12, 1974

[54] MOSQUITO TRAP
[75] Inventor: Spicer C. Jackson, Jacksonville, N.C.
[73] Assignee: The United States of America as represented by the Secretary of the Navy, Washington, D.C.
[22] Filed: Nov. 27, 1972
[21] Appl. No.: 309,846

[52] U.S. Cl..................................... 43/113, 43/139
[51] Int. Cl............................................. A01m 1/08
[58] Field of Search .............. 43/113, 112, 110, 139

[56] References Cited
UNITED STATES PATENTS
| | | |
|---|---|---|
| 3,120,075 | 2/1964 | Barnhart, Sr. ..................... 43/113 X |
| 2,806,321 | 9/1957 | Blackman ......................... 43/113 X |
| 2,931,127 | 4/1960 | Mayo ................................ 43/113 X |
| 3,336,694 | 8/1967 | O'Connell......................... 43/113 X |
| 3,680,251 | 8/1972 | Springer............................ 43/112 |

FOREIGN PATENTS OR APPLICATIONS
358,817   5/1938   Italy...................................... 43/113

Primary Examiner—James H. Czerwonky
Attorney, Agent, or Firm—R. S. Sciascia; J. W. Pease; J. F. Miller

[57] ABSTRACT

A weatherproof trap which will capture mosquitoes or other insects without injury and without gathering larger undesired insects. A fan and light are mounted on a support plate within the trap, and catch trap means are mounted between the open end of the trap and the support plate. The trap is closed at its opposite end by a cover, the opposite end having air escape means therein.

4 Claims, 1 Drawing Figure

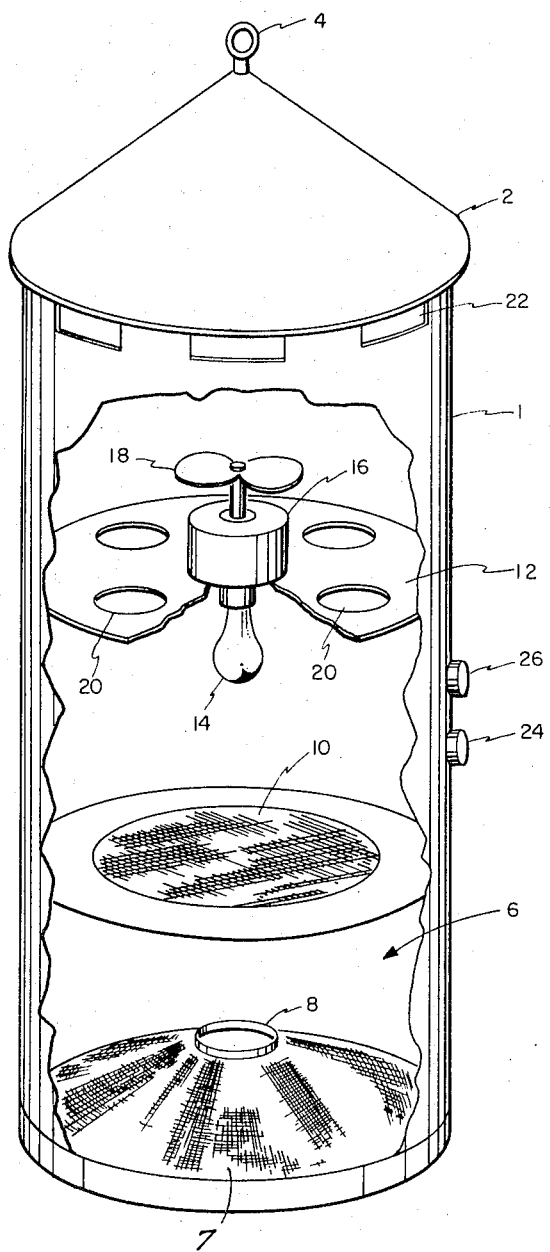

MOSQUITO TRAP

BACKGROUND OF THE INVENTION

The invention is in the field of insect traps.

In the prior art traps have been used for catching insects for many control and research endeavors. Unfortunately the traps used for catching mosquitoes have not been completely satisfactory. For example the two generally recognized traps of the prior art, the "New Jersey Style" and the "CDC" are not weatherproof. The "New Jersey Style" trap does not collect live mosquitoes. In many research applications a supply of live mosquitoes from a particular location are necessary. Even the "CDC" trap kills or injures many mosquitoes by pulling them through a fan blade during the capturing operation so that it is not completely satisfactory for live trap operations. Additionally, the prior art traps destroy or seriously impair the taxonomic value of the mosquitoes trapped by catching numbers of unwanted larger insects so that they are unavoidably included in the mosquito sample. This impugns the validity of many research results.

The invention overcomes the deficiencies of prior art traps by providing a lightweight easily portable trap which is both rugged and waterproof. It captures and preserves mosquitoes live and uninjured and thus is most effective for many important applications. Additionally the invention preserves the taxonomic integrity of a sample by excluding larger insects.

SUMMARY OF THE INVENTION

The invention is a weatherproof mosquito trap which will capture mosquitoes alive and in an uninjured condition. It will preserve live mosquitoes in good condition until the trap can be emptied since large insects which can damage the trapped mosquitoes are excluded. A fan positioned behind a light and a catch cage provides a carefully adjusted updraft of velocity sufficient to suck mosquitoes into a catch trap while allowing larger and stronger insects to escape.

BRIEF DESCRIPTION OF THE DRAWING:

The drawing is a cut-away showing of the invention.

DESCRIPTION OF THE PREFERRED EMBODIMENT:

The invention is shown in the drawing as comprising a cylinder 1 made of a suitable material such as metal or plastic and having a rain-proof cover 2 in which a suspension ring 4 is fixed. A removable catch trap 6 is positioned in the lower part of cylinder 1 and held in position by suitable fastening means not shown. Catch trap 6 has a cone shaped bottom 7 made of suitable material which can be screen and has an opening 8 in the center through which mosquitoes may enter the trap. A screen or perforated top 10 fixed to the cylinder 1 by integral forming therewith as shown or by any other suitable means such as crimping or fasteners (not shown), closes the cylindrical walls of the catch trap 6 so that air can pass through the trap from bottom to top. The openings in top 10 are small enough to prevent insects from escaping. Bottom 7 may be of similar construction or of solid material. The walls of the catch trap may be solid or of screen and are designed to fit closely within the walls of cylinder 1.

A support and stiffening plate 12 supports a light 14 and a fan motor 16. A fan blade 18 pulls air through holes 20 in plate 12 and through catch trap 6. Openings 22 at the top of cylinder 1 permit air to escape underneath cover 2. In practice cover 2 may be considerably larger than shown. Light 14 and motor 16 may be powered by a source such as a battery not shown and controlled by two rheostats 24 and 26 respectively. AC power may be used in permanent and semi-permanent locations.

In operation, the intensity of light 14 may be adjusted using rheostat 24 to obtain an intensity of maximum attractant value for the mosquito types of interest. Lights of different colors may be used as well as other attractants. Fan motor 16 is adjusted by rheostat 26 to a speed which will create a suitable air draft up through catch trap 6, holes 20, and out through openings 22 in cylinder 1. The air draft is carefully regulated to be of just sufficient force to pull mosquitoes which are attracted by light 14 into catch trap 6 through hole 8. A damper not shown can be provided to adjust the size of holes 20 or 22 for a finer draft adjustment, if desired. Since the air draft has just sufficient velocity to pull mosquitoes into the trap the larger and stronger insects which are attracted by the light are able to fly out of the draft and thus escape capture. This has two distinct benefits, one the taxonomic integrity of the mosquito catch is preserved, and two, the mosquito catch is not damaged by the wild thrashings of larger insects caught in the trap.

In operation the trap may be suspended from ring 4 in a location of interest or set upon legs not shown and the light and fan adjusted for maximum effectiveness. Catch trap 6 can be removed and replaced with another periodically without disturbing the trap itself. This is convenient when mosquito samplings at different and/or frequent intervals are desired. The catch traps make convenient storage and handling means for moving the mosquite samples to a central laboratory.

While the invention is simple, it solves a long standing problem and fills a long standing need in a field of great and ever increasing importance. It is generally recognized now that improved apparatus and techniques for studying insects, their life cycles, reproduction, parasites, enemies, migrations, etc. is of the highest priority. Agriculture and the economy and ecology in general may depend on better control and utilization of insects. Large areas now uninhabitable or semi-uninhabitable because of mosquitoes, tsetse flies or other insects may be made useful. In fact the continued existance of the race may eventually be contingent on insect control. The invention is a step forward in the art and is deserving of patent protection.

What is claimed is:

1. In an insect trap the improvement comprising:
   an elongated housing being open at one end and having a cover fixed on the opposite end thereof, said opposite end having openings therein,
   a support plate fixed in said housing adjacent said cover end,
   said support plate having a plurality of apertures forming air passages in said housing adjacent said cover,
   a removable insect catch trap means detachably secured within said opening between said one end and said support plate, an attractant light mounted on said plate within said housing between said catch trap means and said cover, a fan mounted on said plate between said light and said cover, first control means for operating said light to attract insects, and second control means for operating said fan to create an air draft within said housing and passing through said catch trap and out said air passages to draw insects into said catch trap.

2. The apparatus of claim 1, said first control means being adjustable to regulate the intensity of said light for maximum attractant effectiveness.

3. The apparatus of claim 2, said second control means being adjustable to regulate the velocity of said air draft to be effective to draw smaller insects into said catch trap but ineffective to draw larger and/or stronger insects into said catch trap.

4. The apparatus of claim 3, said catch trap means having an outer surface means comprising a cone shaped inwardly projecting member with a smaller opening therein for the passage of insects, and an inner transversely extending surface means for restraining insects from contacting said light or said fan to avoid injury therefrom, said outer and inner catch trap surface means being designed to prevent insects from escaping from said catch trap while permitting the passage of said air draft therethrough.

* * * * *